(12) United States Patent
Dooley

(10) Patent No.: US 6,536,457 B2
(45) Date of Patent: Mar. 25, 2003

(54) FLUID AND FUEL DELIVERY SYSTEMS REDUCING PRESSURE FLUCTUATIONS AND ENGINES INCLUDING SUCH SYSTEMS

(75) Inventor: Kevin Allan Dooley, Mississauga (CA)

(73) Assignee: Pratt & Whitney Canada Corp., Quebec (CA)

( * ) Notice: Subject to any disclaimer, the term of this patent is extended or adjusted under 35 U.S.C. 154(b) by 94 days.

(21) Appl. No.: 09/750,284

(22) Filed: Dec. 29, 2000

(65) Prior Publication Data
US 2002/0083987 A1 Jul. 4, 2002

(51) Int. Cl.$^7$ ................................................ F15C 1/04
(52) U.S. Cl. ..................... 137/13; 137/828; 137/833; 137/826
(58) Field of Search ................. 137/828, 13, 826, 137/833

(56) References Cited

U.S. PATENT DOCUMENTS

| 2,936,041 A | 5/1960 | Sharp et al. |
|---|---|---|
| 2,997,124 A | 8/1961 | Damewood et al. |
| 3,323,305 A | 6/1967 | Klees |
| 4,231,228 A | 11/1980 | Galvin et al. |
| 4,570,745 A | 2/1986 | Sparks et al. |
| 4,794,955 A | 1/1989 | Ejima et al. |
| 4,998,553 A | * 3/1991 | Schram ..................... 137/13 |
| 5,539,164 A | 7/1996 | van Ruiten |
| 5,570,580 A | 11/1996 | Mains |
| 5,941,283 A | 8/1999 | Forte |
| 6,058,709 A | 9/2000 | Richards et al. |
| 6,141,968 A | 11/2000 | Gates et al. |
| 6,360,763 B1 | * 3/2002 | Narayanan et al. ........... 137/13 |

FOREIGN PATENT DOCUMENTS

EP 1030052 8/2000

* cited by examiner

Primary Examiner—A. Michael Chambers
(74) Attorney, Agent, or Firm—Bachman & LaPointe, P.C.

(57) ABSTRACT

Fluid and fuel delivery systems reducing pressure fluctuations and engines including such systems are disclosed. Such systems use a conduit that attenuates pressure fluctuations. Preferably, the conduit attenuates pressure fluctuations by reflecting a portion of a pressure wave within the fluid flow so that reflected pressure waves within the flow interfere with incident pressure waves within the flow, thereby reducing the pressure fluctuations in one embodiment, such a conduit may be formed as a quarter wave stub, in line with the fluid flow. Advantageously, exemplary of the invention, hoot noise in an engine may be reduced by damping pressure fluctuations in the fuel delivery system to the engine.

13 Claims, 8 Drawing Sheets

FLUID AND FUEL DELIVERY SYSTEMS REDUCING PRESSURE FLUCTUATIONS AND ENGINES INCLUDING SUCH SYSTEMS

FIELD OF THE INVENTION

The present invention relates to fluid transport systems generally, and more specifically to engine fuel delivery systems.

BACKGROUND OF THE INVENTION

Many turbine engines, as a result of their design, exhibit undesirable noise. For some engines this noise may include a component that manifests itself as "hoot", having a characteristic frequency. An apparent solution to reducing this noise is to properly muffle it at its source. This, however, is often impossible without locating the root cause of the noise.

Accordingly, an improved engine, designed to exhibit less noise at identified characteristic frequency is desirable. Similarly, methods and devices capable of reducing such characteristic noise are desirable.

SUMMARY OF THE INVENTION

In accordance with the present invention, hoot noise in an engine is reduced by damping pressure fluctuations in the fuel delivery system to the engine. This may be accomplished through the use of a conduit that attenuates such pressure fluctuations. Preferably, the conduit attenuates pressure fluctuations by reflecting a portion of the pressure wave within the fluid flow so that reflected pressure waves within the flow interfere with incident pressure waves within the flow, thereby reducing the pressure fluctuations. In one embodiment, such a conduit may be formed as a quarter wave stub, in line with the fluid flow.

In accordance with an aspect of the present invention, a fuel delivery system includes a conduit for delivering fuel. The conduit has a first end and a second end extending between a first region and a second region, in which a speed of acoustic travel within the fuel differs from a speed of acoustic travel within the fuel in the conduit. The length of the conduit is equal to about an odd multiple of a quarter wave length of an acoustic wave within the fuel within the conduit, so that the wave is reflected from a boundary between the conduit and the second region to destructively interfere with an incident wave at a boundary between the first region and the conduit, and thereby reduce pressure fluctuations within the fuel.

In accordance with another aspect of the present invention, a fluid delivery system, includes a conduit for delivering generally incompressible fluid, extending from between a first region to a second region. wherein speeds of acoustic travel in the fluid in the first and second regions differ from a speed of acoustic travel in the fluid in the conduit. The conduit has; a length equal to about an odd multiple of a quarter wave length of an acoustic wave within the fluid within the conduit, so that the wave is reflected from a boundary between the conduit and the second region to destructively interfere with an incident wave within the fluid in the first region, and thereby reduce pressure fluctuations within the fluid.

In accordance with yet another aspect of the invention, a method of damping pressure variations within a fuel system of an aircraft engine, comprising determining a resonant frequency of a fluid delivery system of the engine; and including a conduit in the fluid delivery system, adapted to reflect forward travelling pressure waves within the fuel to destructively interfere with the forward travelling pressure waves within the fuel, in order to reduce pressure fluctuations in the fuel.

In accordance with a further aspect of the invention, a fluid delivery system includes a conduit having a first end and a second end extending between a first region and a second region for delivering fluid from the first region to the second region, wherein an acoustic impedance of a travelling wave within the fluid varies between the first region, the conduit, and the second region. the conduit having a length between the first end and the second end, equal to about an odd multiple of a quarter wave length of an acoustic wave of a specific frequency within the fluid within the conduit, so that the wave is reflected from a boundary between the conduit and the second region to destructively interfere with an incident wave at a boundary between the first region and the conduit, and thereby reduce pressure fluctuations within the fluid.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of this invention.

DETAILED DESCRIPTION

Many modern engines require fuel delivery at high pressures. As noted, some of these engines exhibit a "hooting" noise at a resonant frequency from time to time. Investigation reveals that the hooting noise, in at least some of these engines, may be attributable to pressure fluctuations in the fuel supply to the engine. These fluctuations in fuel pressure cause power fluctuations in the combustion chamber of the engine, resulting in a fluctuation in fuel demand, which in turn again results in fuel pressure fluctuations, causing the engine to resonate at a characteristic frequency.

Figure 1:
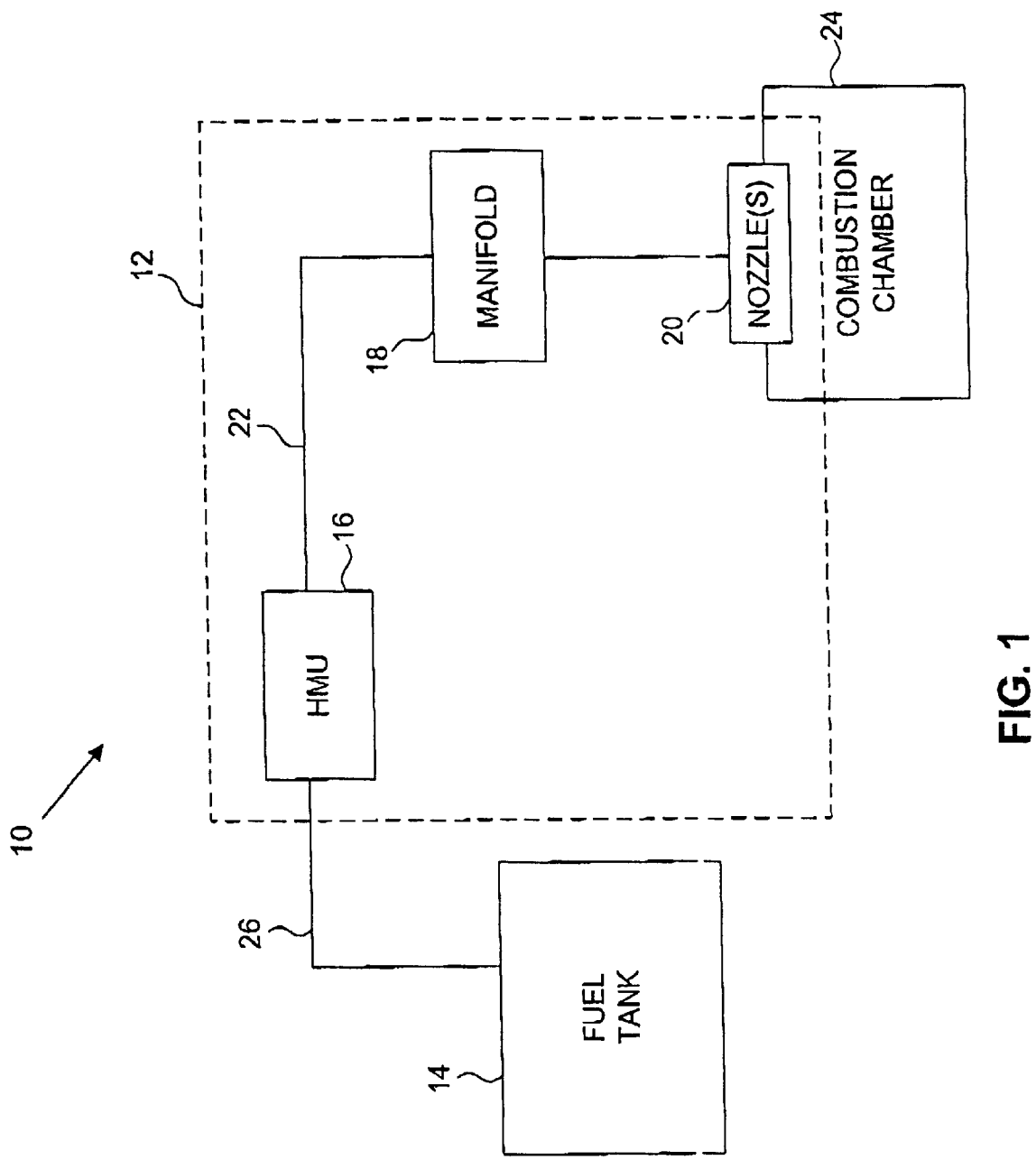
FIG. 1 schematically illustrates a conventional turbine engine.

In order to appreciate this problem, FIG. 1 schematically illustrates a conventional engine 10 including a fuel supply system 12. Fuel supply system 12 is in flow communication with a fuel supply tank 14 storing fuel for combustion by engine 10. As will be appreciated, fuel provided by tank 14 is a generally incompressible fluid. Fuel supply system 12 includes a hydro mechanical unit ("HMU") 16; supply conduit 22; fuel manifold 18; and fuel nozzles 20. HMU 16 is preferably a conventional fuel pump and fuel control system used in aircraft applications. Fuel manifold 18 is in flow communication with HMU 16, by way of supply conduit 22. Fuel nozzles 20 may be known gas turbine engine nozzles, as for example disclosed in U.S. Pat. No. 6,141,948, the contents of which are hereby incorporated by reference. Fuel manifold 18 is made up of a series of rigid tubes incorporating seals, interconnecting each of the fuel nozzles 20, in a way which provides for expansion and contraction of the casings to which the nozzles are mounted. Conduit 22 may be a conventional hollow steel tube, suitable for delivery of fluid at required rates. Nozzles 20 are, in turn, in flow communication with manifold 18 to receive fuel therefrom. A first conduit 26 provides fluid communication between the input of HMU 16 and tank 14. Fuel supply system 12 uses HMU 16 to pump fuel from the tank 14 to a combustion chamber 24 of the engine 10. Engine 10 may be a gas turbine engine used to power aircrafts. Engine 10, may for example be a conventional PWC 306 turbine engine for aircraft use, available from Pratt & Whitney Corporation.

Figure 2:
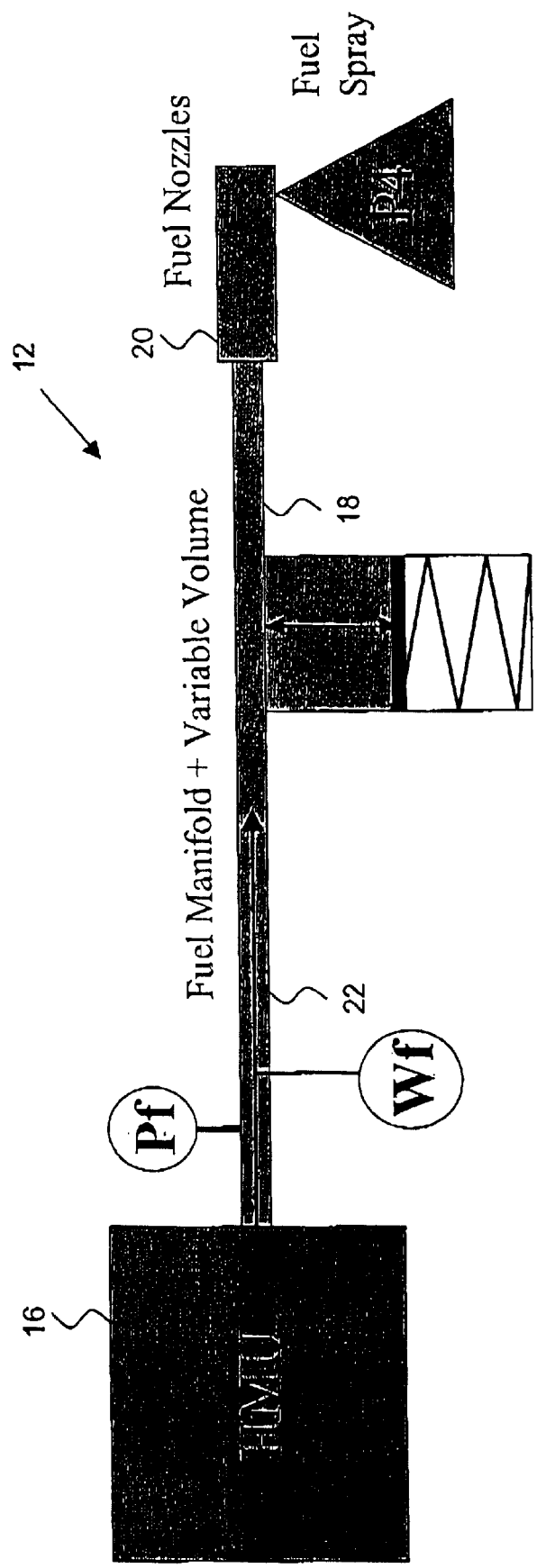
FIG. 2 schematically illustrates a model of a fuel delivery system forming part of the engine of FIG. 1.

FIG. 2 is a further schematic illustration of a simplified model of the fuel supply system 12, of engine 10 of FIG. 1. As illustrated, fuel manifold 18 of fuel supply system 12 may be modeled as having a variable volume The variable volume of fuel manifold 18 is a consequence of the coupled series of tubes that allow for the expansion and contraction of its casings. Volume of manifold 18 may vary with pressure of a fluid carried therein, or with temperature. Thus, as will be appreciated, a pressure wave within fuel delivered by way of manifold 18 may also cause a volumetric fluctuation of manifold 18. This may be particularly pronounced at the mechanical resonant frequency of manifold 18. By contrast, conduit 22 may be modeled as having a fixed volume.

In operation, HMU 16 increases the pressure of fuel provided from tank 14 by conduit 26 (FIG. 1) to Pf and provides fuel at a flow rate of Wf at its output, as illustrated in FIG. 2. As a result of the variable volume of fuel manifold 18, the pressure of fuel entering the manifold may exhibit a characteristic frequency. As a result, fuel arriving at nozzles 20 has a pressure and is discharged into the combustion chamber which has pressure P4.

Figure 3:
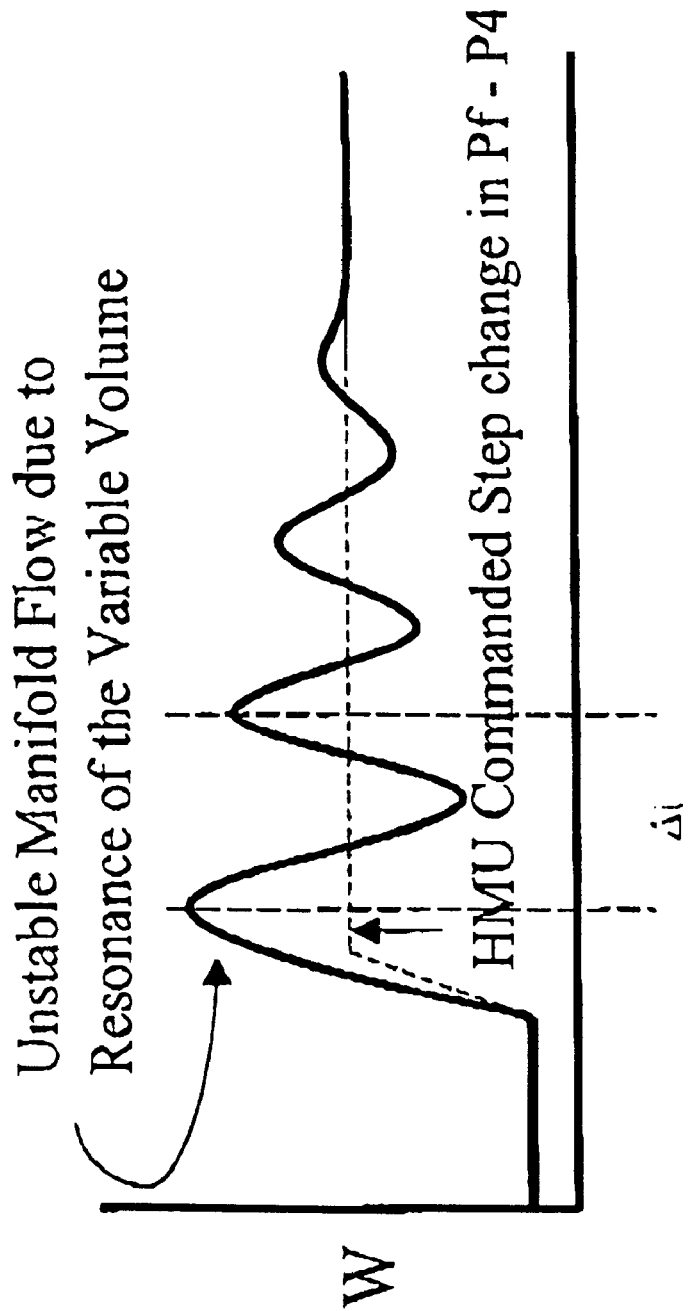
FIG. 3 is a graph illustrating pressure within the system of FIG. 2.

A measured step response of the pressure differential Pf–P4 (i.e. fuel pressure at output of HMU 16 and nozzles 20) of system 12 to an incident pressure wave with flow W is illustrated in FIG. 3. As illustrated, the step response, exhibits ringing at a frequency of $1/\Delta t$. Not surprisingly, this frequency corresponds to the frequency of the observed hoot of the engine.

Figure 4:
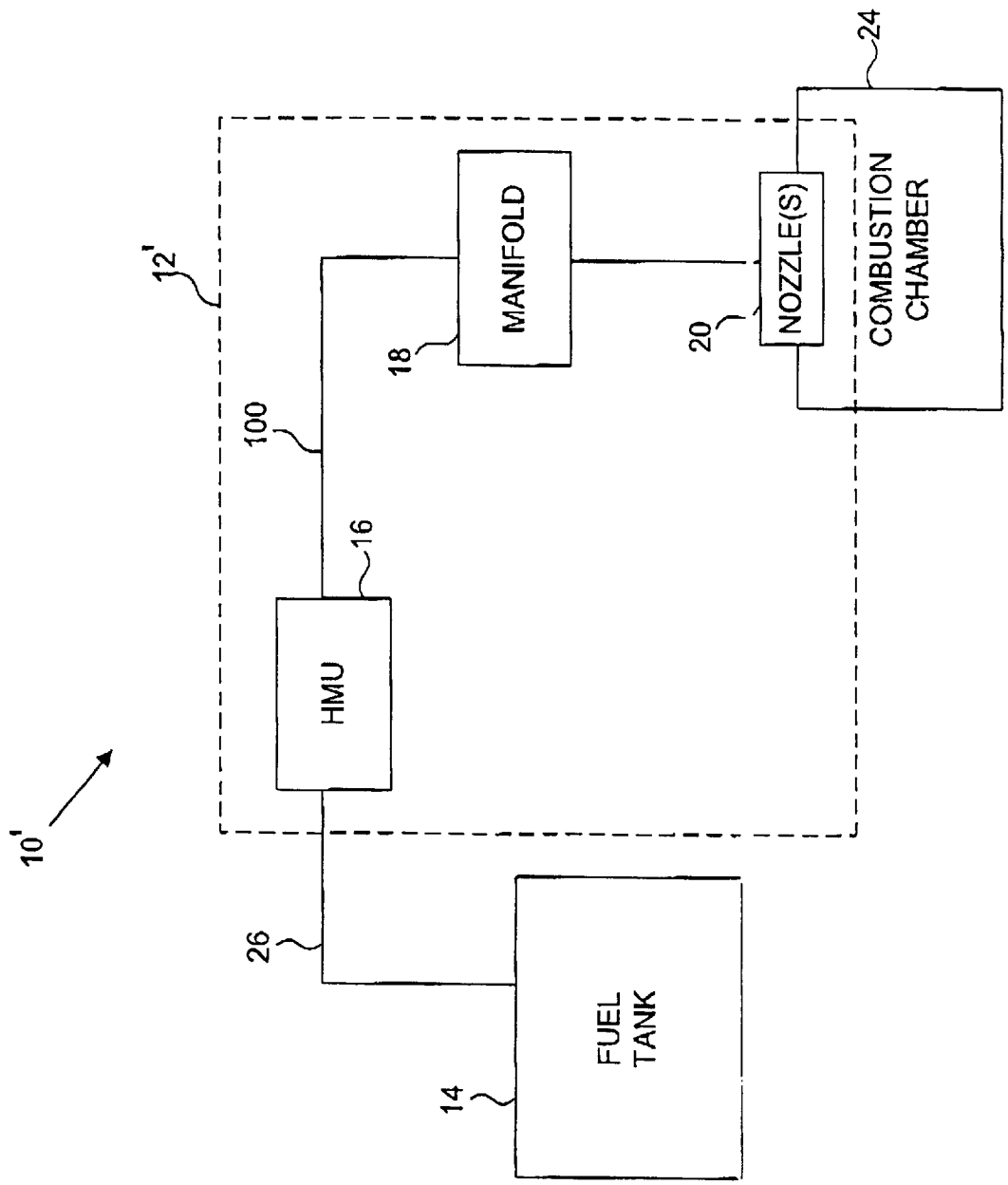
FIG. 4 schematically illustrates a turbine engine, exemplary of an embodiment of the present invention.
Figure 5:
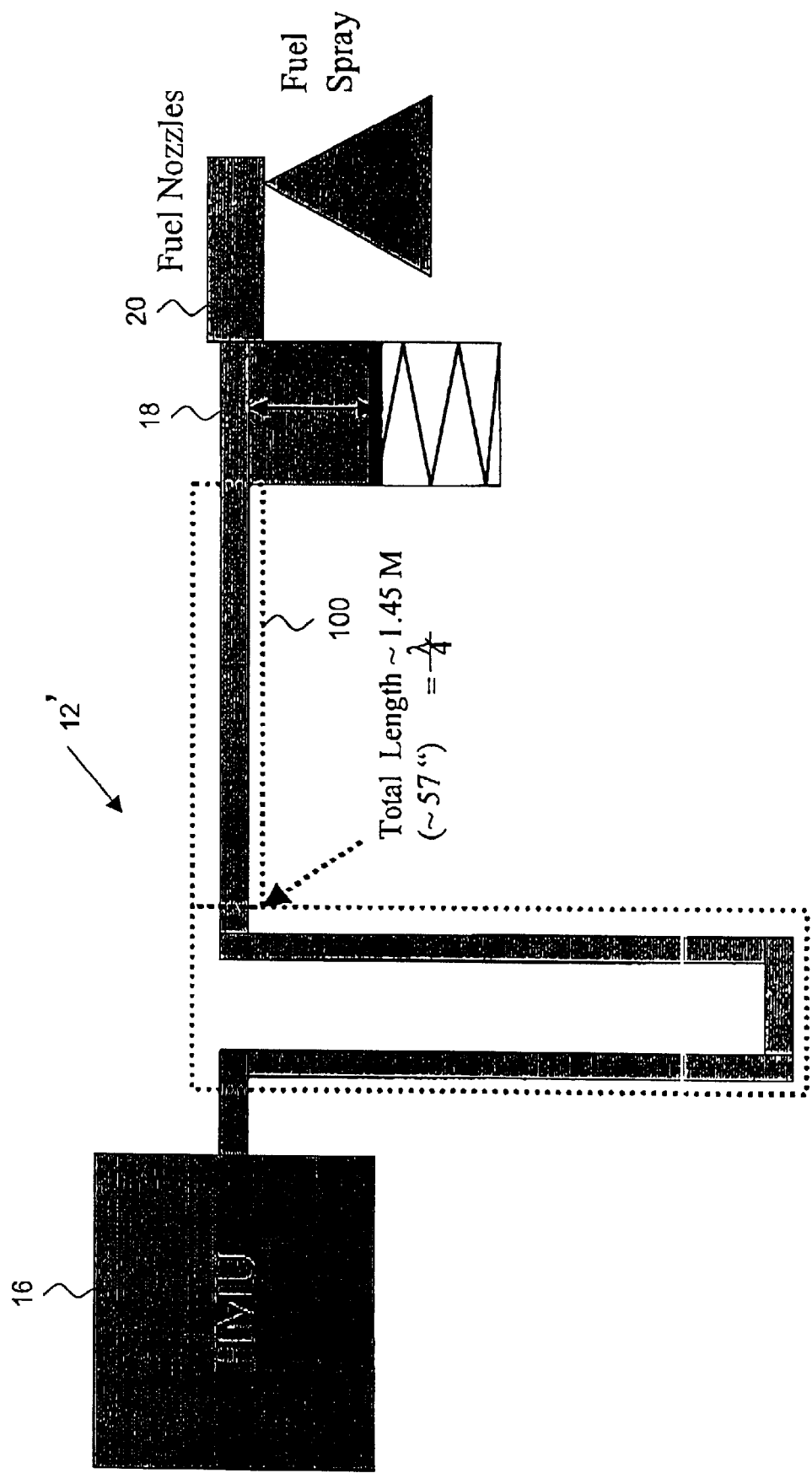
FIG. 5 schematically illustrates a fuel delivery system of the engine of FIG. 4.

Accordingly, FIGS. 4 and 5 schematically illustrates a modified engine 10', exemplary of an embodiment of the present invention. Engine 10' includes fuel delivery system 12' exemplary of an embodiment of the present invention. Engine 10' includes fuel tank 14, conduit 26 and combustion chamber 24 that may be identical to those of engine 10 (FIG. 1). Fuel system 12' includes HMU 16; manifold 18; and nozzles 20, identical to those of fuel system 12 (FIG. 1) HMU 16 has an intake coupled to fuel tank 14 by conduit 26 and an outlet coupled to an intake manifold 18 of engine 10' by exemplary conduit 100.

For reasons that will become apparent, and in a manner exemplary of the present invention, the length of conduit 100 is tuned so that its length is about an odd multiple of a quarter wavelength of the resonant frequency of the observed hoot noise and the resonant frequency of fuel system without modification (i.e. the resonant frequency of fuel system 10 of FIG. 1).

As noted, the hoot is likely caused by pressure fluctuations caused largely by the variable volume fuel manifold 18. As will be appreciated, pressure variations within fuel system 12 are actually travelling waves within the fluid. As such, the speed of the waves will be impacted by the acoustic characteristics of the fluid as carried in the various portions of the fuel system.

As will further be appreciated, the wavelength of arty observed pressure wave within fuel system 12' may be calculated as $$\lambda = f/c$$

where f is the frequency of the pressure wave, and c is the accoustic velocity of the wave within the medium carrying the wave. The speed c of a travelling pressure wave within the fluid, may be approximated by $$c^2 = b/sg$$

where b is net bulk modulus of the fluid, and sg is its specific gravity. As will be appreciated, while sg and b both vary with temperature, these variations tend to compensate each other, though not completely.

Conveniently, material chosen to form conduit 100 causes fluid therein to exhibit significantly different acoustic characteristics than fluid at the output of HMU 16 and in fuel manifold 18 of engine 10'. This is caused largely by the mechanical characteristics of materials and configuration used to form the output of HMU 16; manifold 18; and conduit 100. In the preferred embodiment conduit 100 is formed of steel; output of HMU 16 is formed of aluminum; and fuel manifold 18 is formed of expansively interconnected aluminum tubing, or the like. In particular, the variable volume of manifold 18 reduces the bulk modulus (b) of the fluid therein. Moreover, manifold 18 is excitable by pressure fluctuations at or near the resonant frequency of the manifold 18. As a result, the speed of acoustic waves within conduit 100 is about 5800 m/s; and within manifold 18 it is likely about 1000 m/s.

Figure 6:
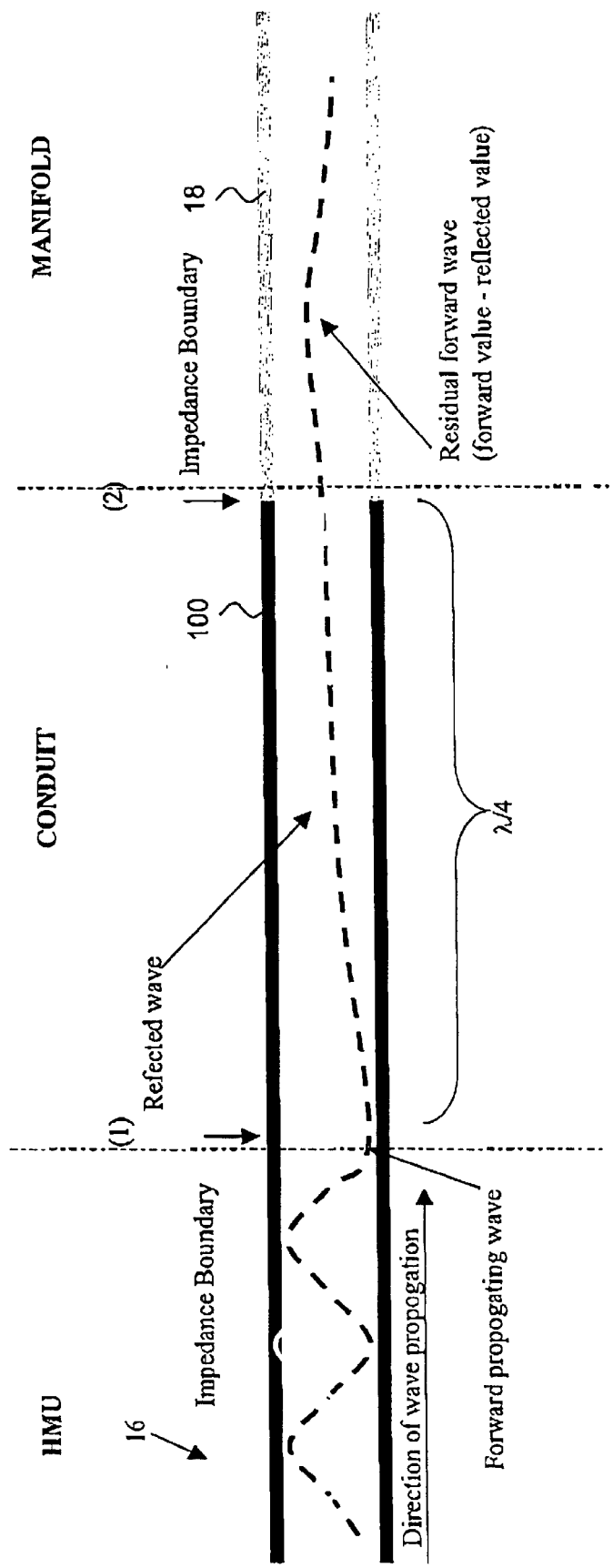
FIG. 6 schematically illustrates travelling pressure waves within fuel delivered by the fuel delivery system of FIG. 5.

FIG. 6 is an enlarged view of conduit 100, including a portion of HMU 16 and fuel manifold 18, illustrating travelling waves within conduit 100. Transitions from HMU 16 to conduit 100, and from conduit 100 to manifold 18 are illustrated as interfaces (1) and (2). As illustrated, conduit 100 has a length equal to an odd-multiple of the quarter wavelength of the resonant frequency (i.e. $(2n+1)/4*\lambda$, n∈ 0, 1, 2 ... ). In view of the mechanical properties of HMU 16, conduit 100, and manifold 18 the acoustic velocity of the traveling wave varies from region to region. The wavelength of the travelling wave may vary accordingly, as illustrated. Because conduit 100 is different to that of the HMU 16, the speed of sound within fluid within conduit 100 is different.

At interfaces (1) and (2), the change in acoustic velocity effectively manifests itself as a difference in the impedance for the travelling wave from HMU 16. As will be appreciated, the impedance of the fluid carrying the travelling wave describes a ratio of stress to strain of the fluid. The velocity of a wave is described by this ratio and the density of the medium (in this case b/sg).

Accordingly, as will be understood by those of ordinary skill, the impedance difference at interfaces (1) and (2) will result in a partial reflection of the travelling wave within the fluid carried by the conduit. This is most pronounced at interface (2). Advantageously, the reflected wave is inverted at the point of reflection. By choosing the length of conduit 100 to be about an odd integer multiple of a quarter wavelength, the reflected wave, by the time it arrives at interface (1), is about 180 degrees (π radians) out of phase with any pressure wave emanating from HMU 16. Advantageously this is also true for waves originating at the manifold 18, in that they will be reflected back to the manifold 180 degrees out of phase with the original wave. Effectively, the incident wave travels through regions of varying impedance as it travels from the region including the output of HMU 16, through conduit 100, and through the region of manifold 18. At the impedance boundaries, the wave is reflected.

As a result, the reflected wave destructively interferes with the incident wave at the boundary, and thereby attenuates any pressure variations within the delivered fuel throughout conduit 100 and manifold 18, arid thereby reduces pressure variations at the resonant frequency and the resultant hooting of engine 10. As such, conduit 100 acts as a quarter wave stub. Conveniently, as conduit 100 carries delivered fuel and is in line with the path of fluid delivery. As such, it cannot trap air, as is possible with known quarter wave stubs as used in refrigeration and power steering fluid circuits, as for example disclosed in U.S. Pat. Nos. 4,231,228 and 3,323,305.

Figure 7:
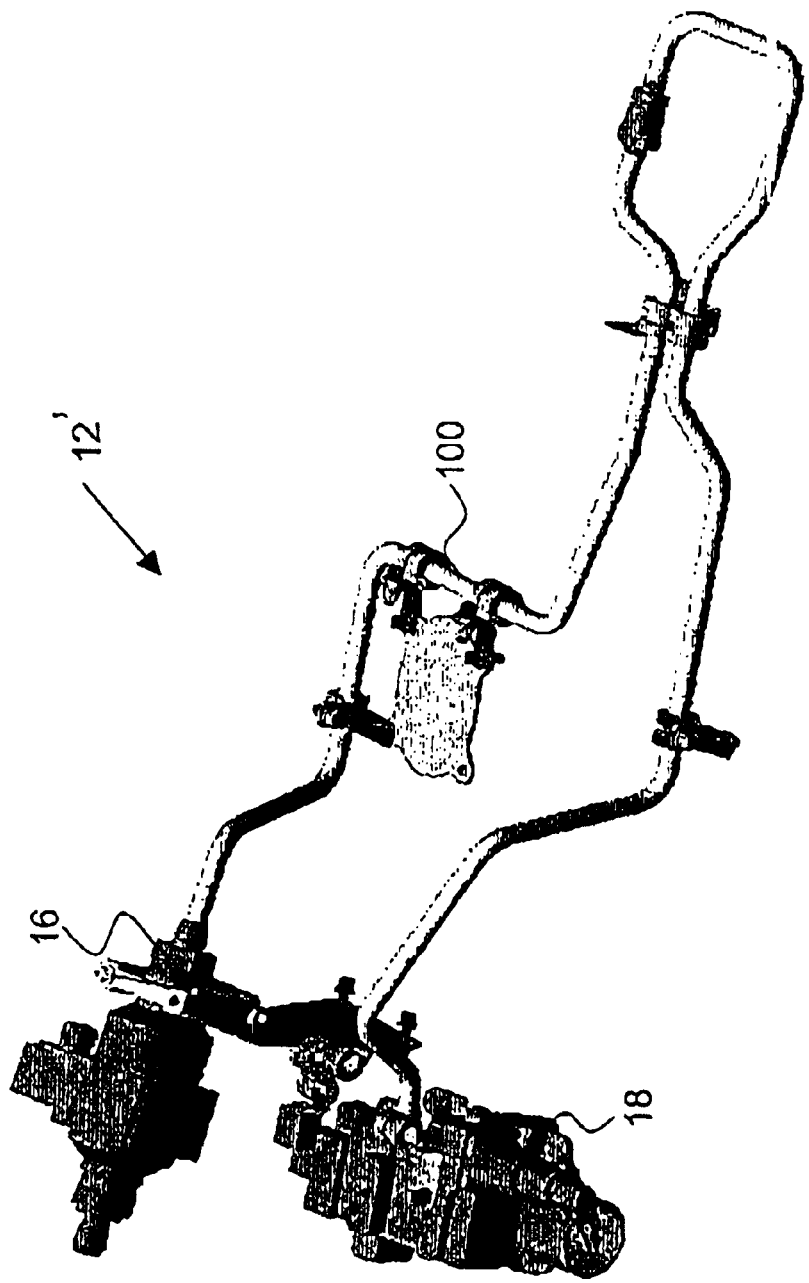
FIG. 7 is a perspective view of an embodiment of the fuel delivery system of FIG. 6.

Fuel system 12', exemplary of an embodiment of the present invention, including HMU 16, and manifold 18 is further illustrated in perspective view in FIG. 7. Example conduit 100 is formed with an inner diameter of about 8 mm to allow fuel delivery at pressures ranging from about 20 psi to about 1200 psi and flow rates of from about 250 lbs/hr to about 2000 lbs/hr. Conduit 100 further has a total length of 1.45 m to reduce an observed hoot of 250 Hz. Of course, other configurations are possible to attenuate the same frequency. Similarly, use of other lengths would be appropriate for other frequencies. Moreover, conduit 100 could easily be retrofitted to existing engines to reduce hoot noise. This could be done by first assessing the resonant frequency on the fuel system (by for example determining the step response of the system, or otherwise), and thereafter producing a conduit 100 having a length of about one-quarter (or an odd multiple thereof) of the wavelength of the resonant frequency.

Figure 8:
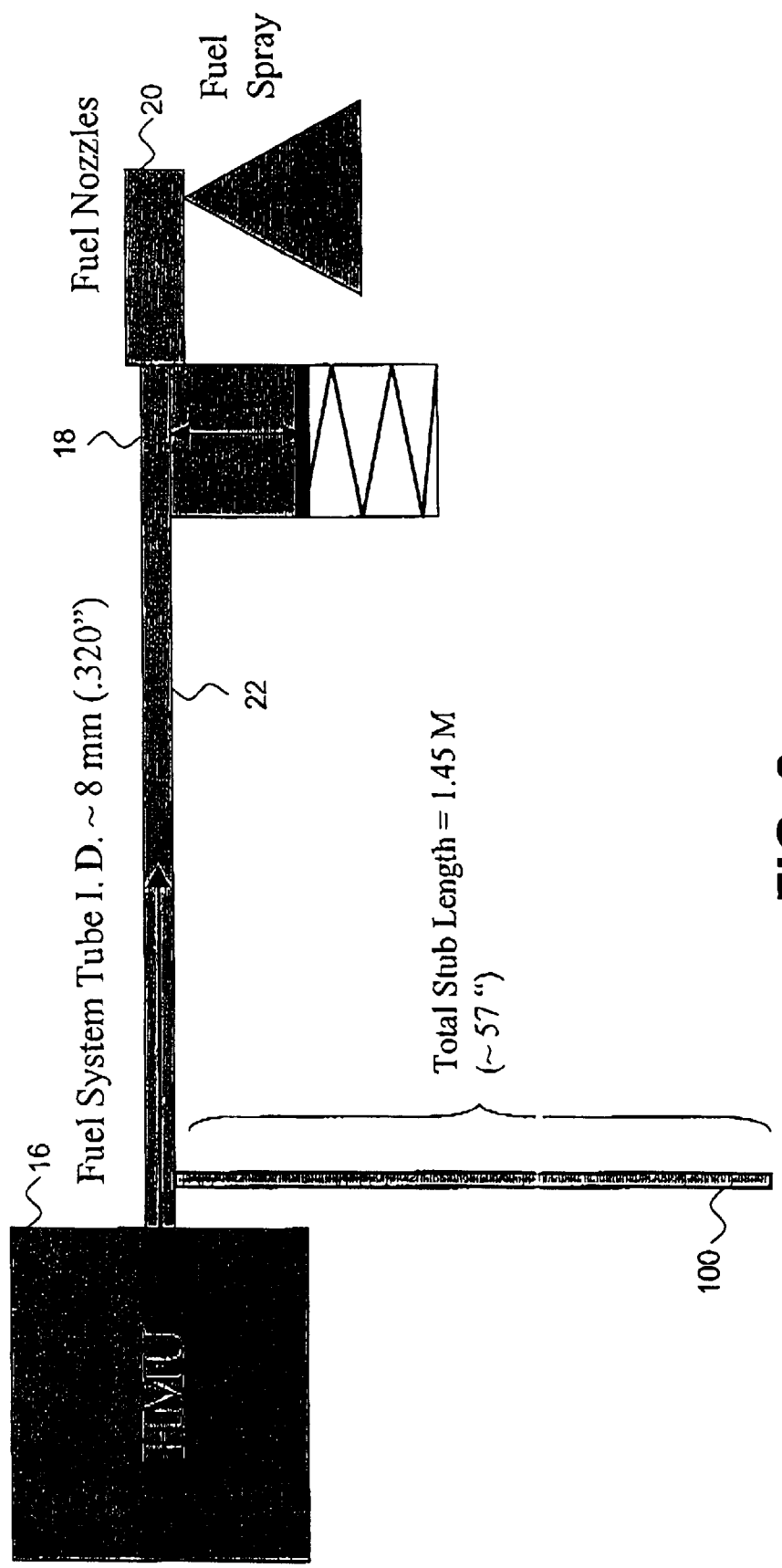
FIG. 8 schematically illustrates a further fuel delivery system.

Although an in-line conduit 100 acting as a quarter wave stub, as illustrated in FIGS. 4–7 is preferred as it cannot trap air, it is not the only possible way to reflect incident pressure waves within a fuel delivery systems, in order to reduce pressure fluctuations. Instead, fuel delivery system 12 of FIG. 1 may be is modified to include a quarter wave length stub 102, having a closed end and extending at least partially transversely from the fluid supply conduit 18 of FIG. 2, as illustrated in the schematic of FIG. 8.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of damping pressure variations within a fuel system of an aircraft engine, comprising
   determining a resonant frequency of a fluid delivery system of said engine;
   including a conduit in said fluid delivery system, adapted to reflect forward travelling pressure waves within said fuel to destructively interfere with said forward travelling pressure waves within said fuel, in order to reduce pressure fluctuations in said fuel.

2. The method of claim 1 wherein said conduit is a quarter wave length stub extending at least partially transversely from a fuel passage within said fuel system.

3. The method of claim 1, wherein said conduit has a length equal to about a quarter wave length of an acoustic wave within fluid flowing within said conduit, and wherein said conduit has an outlet into a region of said fuel delivery system creating an impedance mismatch with said conduit, thereby reflecting at least a portion of said forward travelling waves.

4. A fuel delivery system comprising:
   a conduit for delivering fuel,
   said conduit having a first end and a second end extending between a first region and a second region, in which a speed of acoustic travel within said fuel differs from a speed of acoustic travel within said fuel in said conduit,
   said conduit having a length equal to about an odd multiple of a quarter wave length of an acoustic wave within said fuel within said conduit, so that said wave is reflected from a boundary between said conduit and said second region to destructively interfere with an incident wave at a boundary between said first region and said conduit, and thereby reduce pressure fluctuations within said fuel.

5. The fuel delivery system of claim 4, further comprising a pump in flow communication with said first region to pressurize said fuel.

6. The fuel delivery system of claim 4, wherein said second region is within an engine fuel manifold.

7. The fuel delivery system of claim 6, wherein said fuel manifold has a variable volume.

8. The fuel delivery system of claim 6, wherein said first region comprises an exit of a pump pressurizing said fuel.

9. An aircraft engine comprising the fuel delivery system of claim 4.

10. A fluid delivery system, comprising a conduit for delivering generally incompressible fluid, extending from between a first region to a second region, wherein speeds of acoustic travel in said fluid in said first and second regions differ from a speed of acoustic travel in said fluid in said conduit,
    said conduit having a length equal to about an odd multiple of a quarter wave length of an acoustic wave within said fluid within said conduit, so that said wave is reflected from a boundary between said conduit and said second region to destructively interfere with an incident wave within said fluid in said first region, and thereby reduce pressure fluctuations within said fluid.

11. A fluid delivery system comprising:
    a conduit having a first end and a second end extending between a first region and a second region for delivering fluid from said first region to said second region, wherein an acoustic impedance of a travelling wave within said fluid varies between said first region, said conduit, and said second region,
    said conduit having a length between said first end and said second end, equal to about an odd multiple of a quarter wave length of an acoustic wave of a specific frequency within said fluid within said conduit, so that said wave is reflected from a boundary between said conduit and said second region to destructively interfere with an incident wave at a boundary between said first region and said conduit, and thereby reduce pressure fluctuations within said fluid.

12. The fluid delivery system of claim 11, wherein said second region is within an engine fuel manifold.

13. The fuel delivery system of claim 12, wherein said fuel manifold has a variable volume.

* * * * *